US012639879B2

(12) United States Patent
Croxford et al.

(10) Patent No.: US 12,639,879 B2
(45) Date of Patent: May 26, 2026

(54) SYSTEM, DEVICES AND/OR PROCESSES FOR PREDICTIVE GRAPHICS PROCESSING

(71) Applicant: Arm Limited, Cambridge (GB)

(72) Inventors: Daren Croxford, Swaffham Prior (GB); Guy Larri, Cambridge (GB)

(73) Assignee: Arm Limited, Cambridge (GB)

( * ) Notice: Subject to any disclaimer, the term of this patent is extended or adjusted under 35 U.S.C. 154(b) by 53 days.

(21) Appl. No.: 17/219,606

(22) Filed: Mar. 31, 2021

(65) Prior Publication Data

US 2022/0319090 A1     Oct. 6, 2022

(51) Int. Cl.
*G06T 15/00*     (2011.01)

(52) U.S. Cl.
CPC .................................. *G06T 15/005* (2013.01)

(58) Field of Classification Search
None
See application file for complete search history.

(56) References Cited

U.S. PATENT DOCUMENTS

2014/0028703 A1*   1/2014   Pajak ...................... G06T 11/00
                                                              345/619
2016/0027144 A1*   1/2016   Fernandez ............ G06T 15/005
                                                              345/522
2016/0219325 A1*   7/2016   Chu ................. H04N 21/42653
2018/0115743 A1*   4/2018   McLoughlin ........... A63F 13/00
2020/0289937 A1*   9/2020   Osman .................. A63F 13/335

OTHER PUBLICATIONS

Kyungmin Lee, David Chu, Eduardo Cuervo, Johannes Kopf, Yury Degtyarev, Sergey Grizan, Alec Wolman, Jason Flinn, "Outatime: Using Speculation to Enable Low-Latency Continuous Interaction for Mobile Cloud Gaming", May 2015, ACM, MobiSys '15: Proceedings of the 13th Annual International Conference on Mobile Systems.*
Daniel Sanchez, David Lo, Richard M. Yoo, Jeremy Sugerman, Christos Kozyrakis, "Dynamic Fine-Grain Scheduling of Pipeline Parallelism", Oct. 14, 2011, IEEE, 2011 International Conference on Parallel Architectures and Compilation Techniques, pp. 22-32.*
Klung, et al, AnandTech, "Samsung Galaxy S 2 (International) Review—The Best, Redefined," Sep. 11, 2011, https://www.anandtech.com/show/4686/samsung-galaxy-s-2-international-review-the-best-redefined/15, Downloaded May 2, 2022, 10 Pages.
Smith, AnandTech, "ARM's Mali Midgard Architecture Explored," Sep. 3, 2004, https://www.anandtech.com/show/8234/arms-mali-midgard-architecture-explored/7, Downloaded May 2, 2022, 6 Pages.
Deangelis, "Google wants to reduce Stadia lag with 'negative latency'," Oct. 10, 2019, https://www.engadget.com/2019-10-10-google-stadia-negative-latency.html, Downloaded May 2, 2022, 1 Page.
Wikipedia, "Tiled rendering," https://en.wikipedia.org/wiki/Tiled_rendering, Downloaded May 2, 2022, 4 Pages.

* cited by examiner

*Primary Examiner* — Robert Bader
(74) *Attorney, Agent, or Firm* — Berkeley Law & Technology Group, LLP

(57)     ABSTRACT

Disclosed subject matter relates generally to predictive graphics processing for interactive content.

23 Claims, 12 Drawing Sheets

200

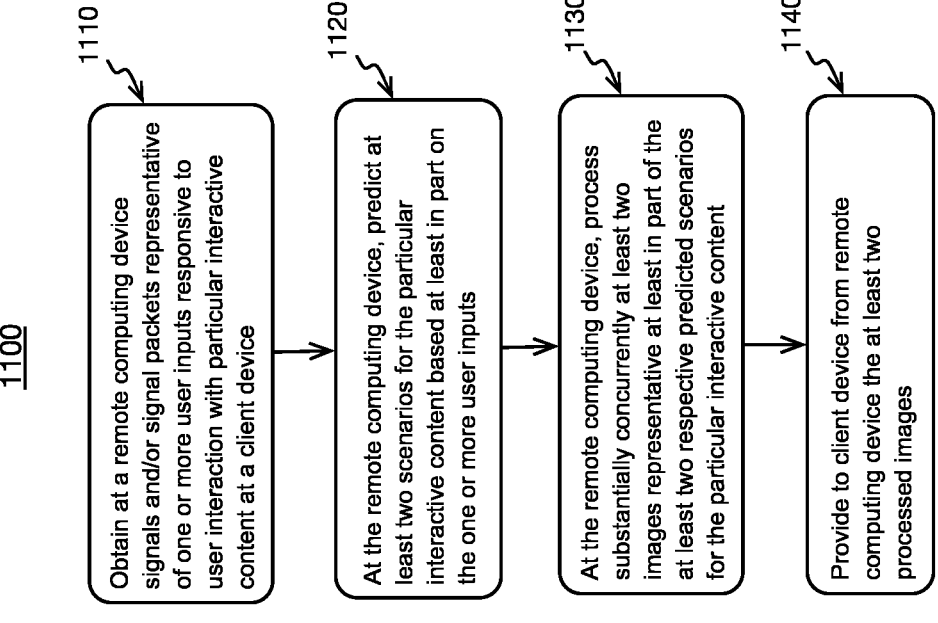

1100

1110 — Obtain at a remote computing device signals and/or signal packets representative of one or more user inputs responsive to user interaction with particular interactive content at a client device 1120 — At the remote computing device, predict at least two scenarios for the particular interactive content based at least in part on the one or more user inputs 1130 — At the remote computing device, process substantially concurrently at least two images representative at least in part of the at least two respective predicted scenarios for the particular interactive content 1140 — Provide to client device from remote computing device the at least two processed images

FIG. 11

SYSTEM, DEVICES AND/OR PROCESSES FOR PREDICTIVE GRAPHICS PROCESSING

BACKGROUND

Field

The present disclosure relates generally to predictive graphics processing for interactive content.

Information

In today's world of interactive computing (e.g., gaming, virtual reality, etc.) there appears to be a trend towards relatively lightly computing-resourced client devices and more fully-resourced remote computing devices (e.g., cloud-based computing devices). Interactive systems such as gaming and/or extended reality (XR), for example, may include one or more user-interactive devices such as game controllers and/or virtual reality goggles/headsets, also referred to as head mounted displays (HMD). XR systems may include mixed reality (MR), virtual reality (VR) and/or augmented reality (AR), for example. In some circumstances, user-interactive devices may have relatively few computing resources and may communicate over a network (e.g., the Internet, wireless local area network, etc.) with one or more computing devices having significantly greater computational capabilities. Potential benefits from such systems may include, for example, reduced costs and/or increased performance over other types of interactive systems. However, challenges may be realized due at least in part to latency that may be inherent whenever devices communicate with each other over a network (e.g., the Internet). For gaming and/or XR systems, for example, excessive latency may result in a user perceiving sluggish performance. For example, a user may perceive a delay between user input (e.g., a button push) and a reaction to the user input (e.g., some sort of change to a visual display based on the user input) due at least in part to latency caused by communication delays between client device and remote computing device.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 11 is a flow diagram depicting an example process for substantially concurrent processing of image content for multiple respective predicted scenarios, in accordance with embodiments.

Figure 1:
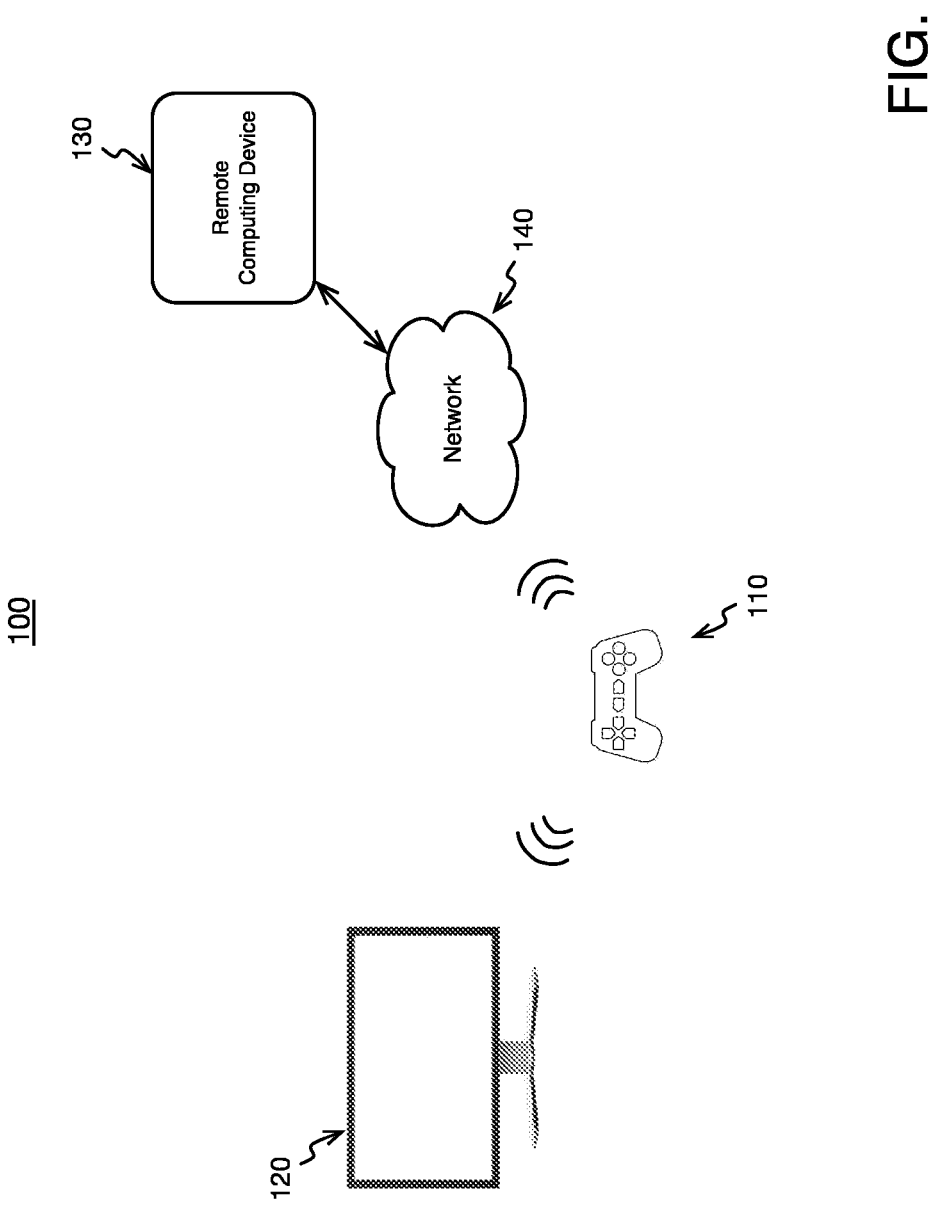
FIG. 1 is a schematic diagram of an example interactive computing environment in accordance with embodiments.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Further, it is to be understood that other embodiments may be utilized. Also, embodiments have been provided of claimed subject matter and it is noted that, as such, those illustrative embodiments are inventive and/or unconventional; however, claimed subject matter is not limited to embodiments provided primarily for illustrative purposes. Thus, while advantages have been described in connection with illustrative embodiments, claimed subject matter is inventive and/or unconventional for additional reasons not expressly mentioned in connection with those embodiments. In addition, references throughout this specification to "claimed subject matter" refer to subject matter intended to be covered by one or more claims, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned, in today's world of interactive computing (e.g., gaming, virtual reality, etc.) there appears to be a trend towards relatively lightly computing-resourced client devices and more fully computing-resourced remote computing devices (e.g., cloud-based computing devices). For example, interactive systems (e.g., gaming and/or extended reality (XR)) may include one or more user-interactive devices (e.g., game controllers, head-mounted displays (HMD), etc.) having relatively few computing resources communicating over a network (e.g., the Internet, wireless local area network, etc.) with one or more computing devices having significantly greater computational capabilities. Potential benefits from such systems may include, for example, reduced costs and/or increased performance, such as reduced energy consumption (longer battery life), reduced size and/or reduced weight, etc., over other types of interactive systems. However, challenges may be realized due at least in part to latency that may be inherent whenever devices communicate with each other over a network (e.g., the Internet) and/or due at least in part to execution of relatively computing-intensive operations. For gaming and/or XR systems, for example, excessive latency may result in a user perceiving sluggish performance. For example, a user may perceive a delay between user input (e.g., a button push, voice command, etc.) and a reaction to the user input (e.g., some sort of change to a visual display and/or audio output based on the user input) due at least in part to latency caused by communication delays between client device and remote computing device and/or due at least in part to execution of computing-intensive operations.

FIG. 1 is a schematic diagram of an example embodiment 100 of an interactive computing environment, including a client device 110 in communication with a remote computing device 130 over a network 140. In a particular implementation, a display device 120 may receive display and/or audio content from client device 110 and/or from remote computing device 130. As utilized herein, "remote computing device" and/or the like refers to a computing device to which a user has no physical access, either permanently or temporarily, and to which a user may communicate via a separate computing device (e.g., client device) over a network (e.g., Internet, wireless local area network, etc.). For a particular implementation, client device 110 may comprise a game controller, for example. However, subject matter is not limited in scope in this respect. For example, client device 110 and/or display device 120 may comprise XR devices (goggles, headsets, etc.) in particular implementations. In other implementations, client device 110 and/or display device 120 may include smart phones, tablet devices, watches, laptop and/or notebook computers, televisions, set-top boxes, game consoles, etc., for example.

Figure 4:
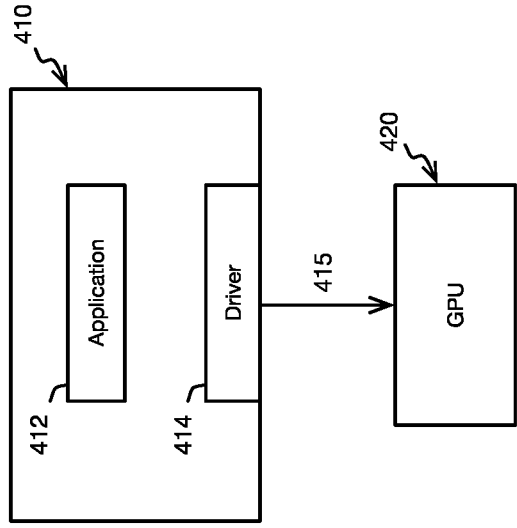
FIG. 4 is a schematic diagram depicting an example computing device including a graphical processing unit, in accordance with embodiments.
Figure 12:
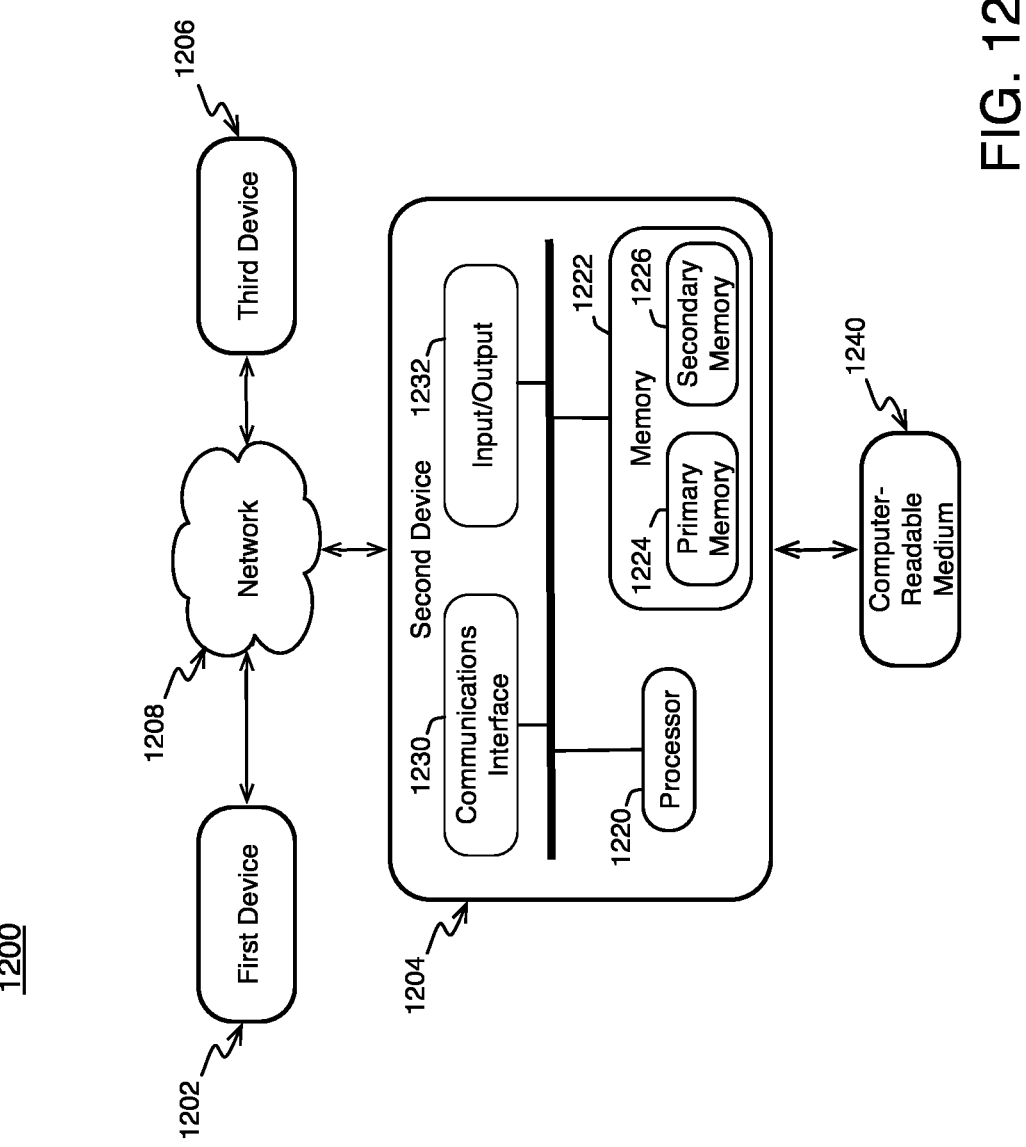
FIG. 12 is a schematic diagram illustrating an example computing environment, in accordance with embodiments.

In implementations, client device 110 may comprise a computing device including one or more processors, one or more communications interfaces, one or more user input devices (e.g., touch screen, push buttons, etc.), one or more memory devices, etc. In particular implementations, client device 110 may comprise at least some characteristics of example computing device 400 depicted in FIG. 4 and/or example computing device 1204 depicted in FIG. 12. FIG. 4 and FIG. 12 are discussed more fully below. Similarly, remote computing device 130 may comprise at least some characteristics of example computing device 400 and/or example computing device 1204, for example.

In particular implementations, client device 110 may comprise a relatively lower cost, reduced computing resource device while remote computing device 130 may incorporate relatively much greater computing resources including, for example, one or more graphical processing units (GPU). Client device 110 and/or remote computing device 130 may execute interactive content such as, by way of non-limiting examples, game content, XR content, etc. For example, a user may interact with particular game content via interactions with client device 110. In an implementation, client device 110 may communicate with remote computing device 130. For example, client device 110 may transmit signals and/or signal packets representative of user inputs (e.g., user interactions with a touch screen, push buttons, voice commands, etc.) to remote computing device 130. Further, in an implementations, remote computing device 130 may perform relatively computing resource-intensive operations pertaining to the particular game content, including relatively computing-intensive graphics processing, for example. Additionally, for example, remote computing device 130 may transmit image and/or audio content to client device 110 and/or display device 120 for presentation to the user. In this manner, for example, image and/or audio content presented to the user may be perceived by the user as responding to inputs provided by the user via client device 110.

However, communications between client device 110 and remote computing device 130 may incur varying amounts of latency depending at least in part on characteristics of network 140, for example. Further, for example, additional latencies may result from execution of relatively computing-intensive operations at remote computing device 130. Relatively small latencies may not be perceivable by a user as the user interacts with client computing device 110 and/or observes updates to display device 120, for example. However, relatively larger latencies incurred at least in part due to communication via network 140 and/or due at least in part to execution of computing-intensive operations at remote computing device 130 may be perceivable by a user thereby resulting in a degraded user experience. For example, in game applications, for example, nimble response to user input may play an important part in the overall user experience. By way of contrast, sluggish response as perceivable by a user may provide a frustrating user experience. Achieving nimble response to user input may be a particularly desirous goal for interactive content system designers, for example.

To achieve nimble response to user input, particular implementations may attempt to mitigate consequences of latencies due to communications and/or due to execution of computing-intensive operations via prediction of future user inputs and/or by speculatively performing particular computing-intensive operations, such as graphics processing, for example, based on predicted user inputs. In other words, particular operations, such as computing-intensive graphics processing, may be pre-performed based at least in part on predicted user inputs so that remote computing device 130 and/or client computing device 110 may respond relatively quicker to actual user inputs. In an implementation, for example, remote computing device 130 may speculatively generate image and/or audio content based on predicted user input and/or client device 110 may respond to subsequent actual user input by presenting image and/or audio content speculatively generated by remote computing device 130 to the user (e.g., via display device 120). In this manner, a user may perceive a substantially immediate reaction to user input, for example. "Substantially immediate" in this context refers to a delay between user input and an update to visual and/or audio content presented to the user based on the user input short enough in duration to not be readily perceivable by the user. That is, an update to visual and/or audio content presented to the user may be perceived by the user to flow naturally and without delay from the user input, for example.

In implementations, multiple versions of particular image content may be speculatively generated to prepare, at least in part, for multiple possible user inputs. For example, a game application may accept input from a user and may alter a display presented to the user in a number of different ways depending at least in part on the user input. In implementations, multiple possible user inputs may be predicted and/or image content pertaining to the multiple possible user inputs may be speculatively generated. As utilized herein "scenario," "predicted scenario" and/or the like refer to particular image content to be speculatively generated based at least in part on one or more predicted user inputs.

For example, in particular implementations, multiple scenarios may be processed based at least in part on predicted user input. Further, in implementations, a particular scenario of the multiple scenarios may be selected based at least in part on subsequent user input. For example, remote computing device 130 may speculatively perform graphics processing to generate image content for multiple scenarios based on predicted user input and/or may provide speculatively-generated image content for the multiple scenarios to client device 110. Further, in an implementation, client device 110 may select a particular scenario of the multiple scenarios based at least in part on a subsequent user input and/or may provide appropriate image content for the selected scenario, previously processed by and/or received from remote computing device 130, to display device 120. In this manner, a user may perceive a substantially immediate update to content displayed at display device 120 in response to user input, for example. In other implementations, remote computing device 130 may select a particular scenario of the multiple scenarios based at least in part on a subsequent user input and/or may provide appropriate image content for the selected scenario to client device 110 and/or to display device 120. In additional implementations, decisions with respect to selecting a particular scenario and/or with respect to selecting appropriate image content may be performed at least in part by both client device 110 and remote computing device 130, for example.

As mentioned, client device 110 and/or display device 120 may comprise game controllers, XR devices, smart phones, tablet devices, watches, laptop and/or notebook computers, televisions, set-top boxes, game consoles, etc., for example. Further, in implementations, remote computing device 130 may comprise a cloud-based computing device. "Cloud-based computing device" and/or the like refers to one or more networked remote server computing devices hosted on the Internet to store, manage and/or process content. In other implementations, remote computing device 130 may comprise a game console or other computing device situated in a home or office, for example, that may be accessed by a client device via a network (e.g., WiFi, Internet, cellular network, etc.). In some implementations, a user may access a remote computing device 130 situated in a home or office from within the home or office. In other implementations, a user may access a remote computing device 130 situated in a home or office from a remote location, such as hotel room, for example.

Figure 2:
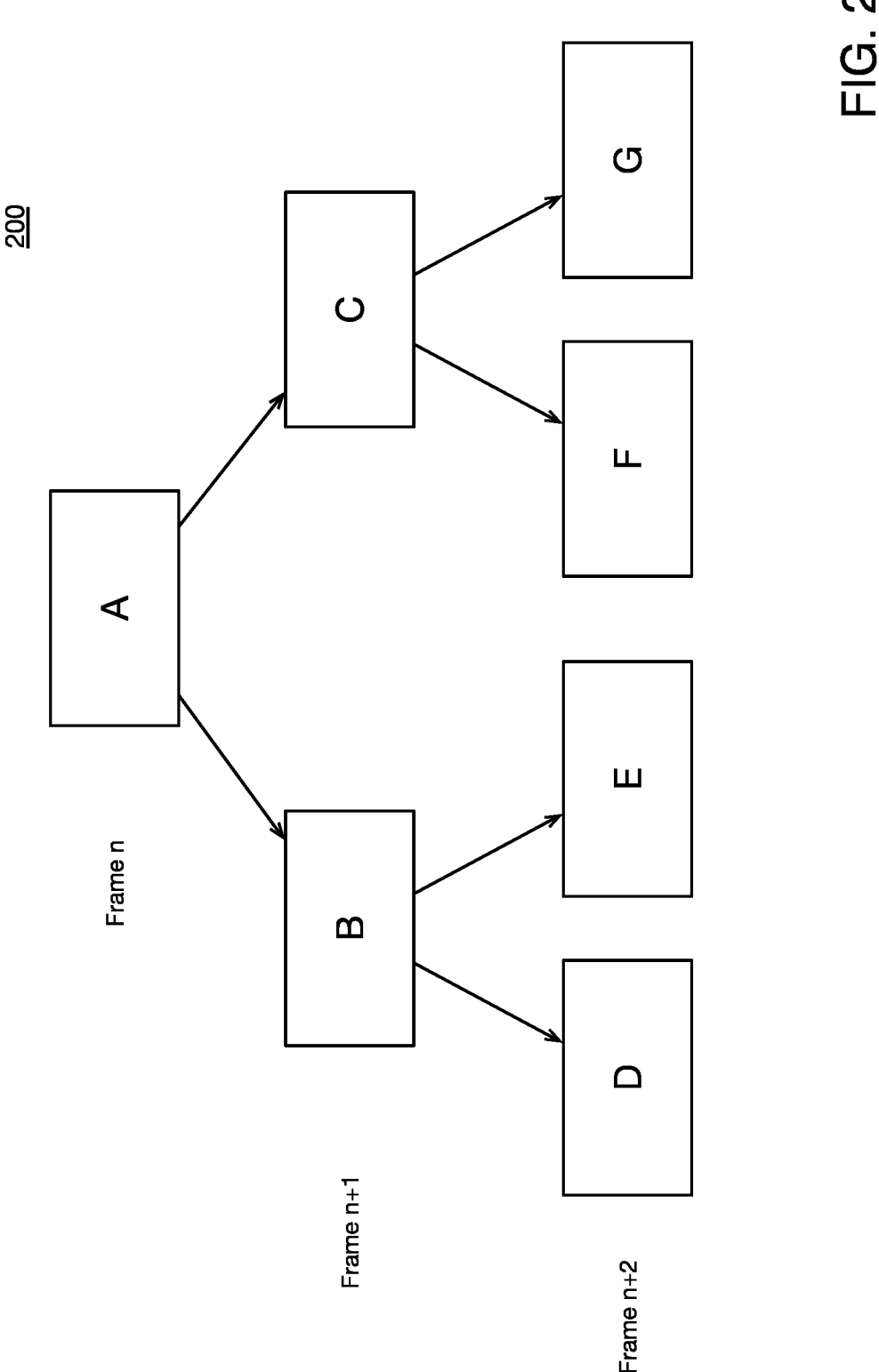
FIG. 2 is a schematic diagram illustrating an example process for generating multiple image content scenarios at a remote computing device based at least in part on predicted user input, in accordance with embodiments.

FIG. 2 is a schematic diagram illustrating an example process 200 for predicting multiple scenarios based on user interaction with particular interactive content. In FIG. 2, blocks labelled "A" through "G" represent frames of image content, for example. For XR and/or game applications, for example, a display, such as display device 120, may be updated with frames of image content many times each second. Generation of frames of image content may by performed by one or more processing devices, such as graphical processing units (GPU). In particular implementations, operations to generate frames of image content may be performed by one or more GPUs at remote computing device 130. For example process 200, frame "A" represents a frame of image content to be processed at remote computing device 130. As mentioned, to reduce and/or eliminate user-perceivable latency in response to user input, multiple predicted scenarios may be speculatively processed based at least in part on predicted user input. For example, one or more central processing units (CPU) of remote computing device 130 may generate predicted scenarios based on predicted user input. In an implementation in which a user may interact with a particular game application, for example, remote computing device 130 may predict a subsequent user input based at least in part on one or more characteristics of the particular game application and/or based at least in part on previous user inputs. In particular implementations, predicting user input may be performed at least in part via machine learning operations, for example.

Based at least in part on predicted user input, multiple predicted scenarios may be generated, in an implementation. For example, frames "B" and "C" may respectively represent image content for two predicted scenarios, wherein either frame "B" and/or frame "C" may be processed at remote computing device 130 and/or may be provided to client device 110 in anticipation of subsequent user input. Whether frame "B" or frame "C" may be eventually selected for display via display device 120 may depend at least in part on a particular user input provided via user interaction with client device 110. Further, for example, frames "D," "E," "F" and/or "G" may be processed at remote computing device 130 and/or may be provided to client device 110 in anticipation of further subsequent user input. Again, which of frames "D," "E," "F" and/or "G" to be ultimately selected for display to the user may depend at least in part on additional subsequent user input. Because for the present example frames "B" through "G" have been speculatively processed by remote computing device 130 and/or have been speculatively provided to client device 110 based at least in part on multiple predicted scenarios, a user may perceive substantially immediate response to user input. Further, because at least some computing-intensive tasks such as graphics processing may be performed at remote computing device 130, client device 110 may be implemented as relatively lower cost devices having relatively fewer computing resources while still providing relatively rapid perceived response to user input and/or while providing an enhanced user experience.

As explained in more detail below, due at least in part to the relatively intensive computational resource utilization incurred in speculatively processing multiple predicted scenarios, including, for example, speculative generation of frames of image content for multiple predicted scenarios, techniques for improving efficient utilization of computing resources may be advantageously employed. In the discussion that follows, various aspects of graphics processing are discussed in general terms and/or in regard to particular implementations. Example implementations directed at relatively more efficient utilization of graphics processing resources are also discussed.

Figure 3:
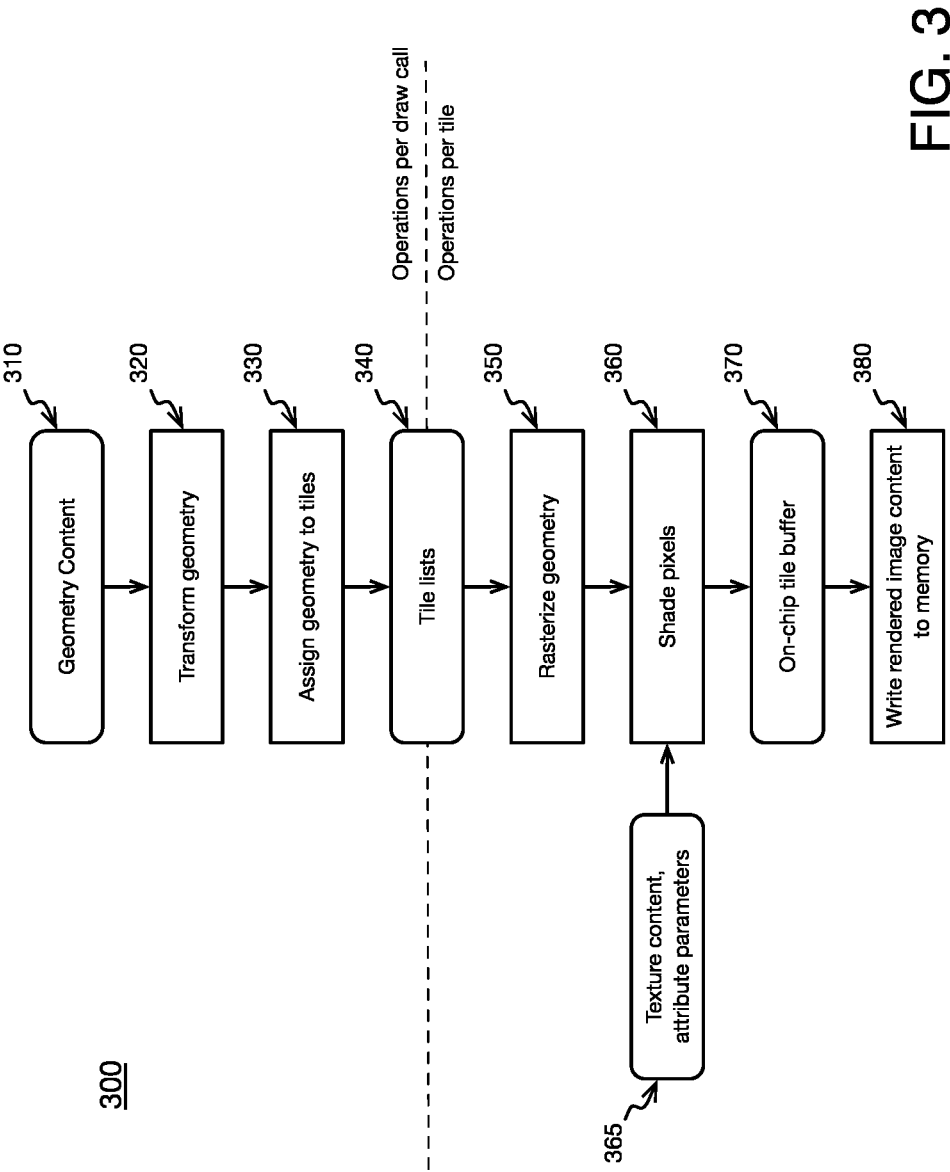
FIG. 3 is a flow diagram depicting an example process for graphical content processing, in accordance with embodiments.

FIG. 3 is a flow diagram depicting an embodiment 300 of an example process for graphical content processing. In an implementation, operations indicated at least in part by example process 300 may be performed at remote computing device 130 and/or at client device 110 or a combination thereof. In particular implementations, particular operations to be performed by particular computing devices may be determined based at least in part on available computing resources. For example, computationally-intensive operations may be advantageously performed by remote computing device 130. It should be noted that content acquired or produced, such as, for example, input signals, output signals, operations, results, etc. associated with example process 300 may be represented via one or more digital signals. It should also be appreciated that even though one or more operations are illustrated or described concurrently or with respect to a certain sequence, other sequences or concurrent operations may be employed. In addition, although the description below references particular aspects and/or features, one or more operations may be performed with other aspects and/or features.

Example process 300 may illustrate various example aspects of graphics processing. For example, as depicted at block 310, graphics processing may begin, in an implementation, with geometry content for a scene to be rendered. In an implementation, geometry content may pertain to particular interactive content such as, for example, one or more game applications and/or one or more XR applications, although, of course, subject matter is not limited in scope in this respect. In an implementation, image geometry content may be specified by way of a series of primitives (e.g., polygons). In an implementation, geometry content may be partitioned at least in part into a plurality of individual content entities such as graphics vertices, for example. In an implementation, individual graphics vertices may comprise respective positional parameters to indicate a position in a three-dimensional space. In an implementation, to render image content representing a particular scene (e.g. from different viewpoints and/or representing different predicted scenarios), geometry content may be transformed from a three-dimensional space to a screen space, as depicted at block 320. In an implementation, speculative processing of predicted scenarios may include transforming geometry content to respective screen spaces for multiple predicted images corresponding to multiple predicted scenarios.

Further, as depicted at block 330, transformed geometry (e.g., vertices and/or other primitive content) may be presented to a tiling operation. In an implementation, tiled rendering may involve subdividing a graphics image into smaller portions (e.g., subdivided according to a grid) in screen space and/or may include rendering individual portions, or tiles, of the grid separately (although, as discussed more fully below, multiple tiles and/or other portions of an image may be processed substantially concurrently, in an implementation). In an implementation, tiles may comprise regularly-shaped sub-regions, although subject matter is not limited in scope in this respect.

In an implementation, a tiling operation, such as may be depicted at block 340, may generate primitives from geometry content and/or may determine which primitives may not be visible within a particular image to be rendered. At least in part in response to determining particular primitives that may not be visible within a particular image to be rendered, particular primitives may be culled from a primitive list, for example. In an implementation, primitives determined to be visible within a particular image to be rendered may be assigned to particular tiles. For example, a tiling operation may prepare lists of primitives for individual tiles. In an implementation, a tile list for a particular tile may indicate particular primitives to be processed for that particular tile.

As indicated at block 350, primitives indicated in a tile list may be subjected to appropriate front-end processing operations, such as, for example, rasterization to fragments. In an implementation, a fragment may comprise content (e.g., parameters and/or values) sufficient to generate a single pixel of an image to be stored in a frame buffer. Rasterization may also include, for example, rendering image content to a texture store in addition to and/or rather than to a frame buffer. In an implementation, fragments generated by a rasterization operation, such as operation 350, may be presented to a shader operation, as indicated at block 360. In an implementation, a shader operation may obtain texture content and/or attribute parameters 365 and/or may render fragments based at least in part on the obtained text and/or attribute content. In an implementation, a shader operation may generate parameters representative of colors and/or depth for particular pixels corresponding to particular fragments, for example. For example, fragment rendering may include, for example, modification of color parameters (e.g., red, green and/or blue parameters) and/or parameters representative of transparency values (e.g., alpha values) for individual fragments. Further, in an implementation, rendered image content may be stored to a tile buffer, as indicated at block 370. In an implementation, a tile buffer may comprise an on-chip (e.g., same integrated circuit die and/or package as a graphical processing unit) memory, for example. Further, as indicated at block 380, rendered image content may be stored in a memory, such as to a tile buffer.

Also, in an implementation, color, surface normal and/or depth parameters, for example, may be rendered and/or may be stored in a tile buffer for deferred shading operations. In implementations, a content store for deferred shader operations may be referred to as a G-buffer, for example. In an implementation, one or more additional rendering passes may perform lighting operations. Hybrid ray-tracing operations may be performed, for example. In an implementation, hybrid ray-tracing may write-out image content similar to deferred shading after which a ray-tracing pass may be performed, for example.

In an implementation, rendered image content may comprise rendered frames for multiple predicted scenarios, as discussed more fully below. In particular implementations, one or more graphics processing operations may be performed substantially concurrently for particular regions of image content pertaining to multiple predicted scenarios. For example, pixel shading operations for particular tiles pertaining to frames of image content for respective predicted scenarios may be performed substantially concurrently. In an implementation, substantially concurrent processing of particular tiles from different frames corresponding to respective predicted scenarios may take advantage of memory locality with respect to texture and/or attribute content, for example, as explained more fully below. As also explained more fully below, for circumstances in which tile lists for a particular region are the same or are substantially similar across multiple predicted scenarios, only a single tile list may be processed and/or a single result may be generated, in an implementation.

FIG. 4 is a schematic diagram depicting an embodiment 400 of an example graphics processing system including, for example, at least one processor 410 and/or at least one graphical processing unit (GPU) 420. In an implementation, an application 412 (e.g., game application and/or XR application) may be executed at least in part by processor 410. Also, in an implementation, processor 410 may provide commands and/or parameters 415 to GPU 420. GPU 420 may include a graphics processing pipeline that may implement one or more operations described above in connection with FIG. 3, for example. For example, application 412 may generate application programming interface (API) calls that may be interpreted by a driver 414 corresponding to a graphics processing pipeline of GPU 420. In an implementation, driver 414 may be executed by processor 410 to generate and/or provide appropriate commands and/or parameters 415 to GPU 420. Further, in an implementation, GPU 420 may generate image content requested by application 412, for example. For example, based at least in part on commands and/or parameters 415 generated by driver 414 executed at processor 410, GPU 420 may speculatively generate frames of image content for predicted scenarios.

In implementations, remote computing device 130 may incorporate one or more aspects and/or characteristics of example graphics processing system 400. For example, remote computing device 130 may include at least one processor, such as processor 410, and/or may include at least one GPU, such as GPU 420. Further, remote computing device 130 may execute an application, such as a game application and/or XR application, for example, and/or may speculatively process image content pertaining to multiple predicted scenarios utilizing one or more aspects of example process 300, in an implementation. As mentioned, remote computing device 130 may provide speculatively-generated image content to client device 110, wherein client device 110 may select particular speculatively-generated image content to display to a user based at least in part on subsequent user input, for example.

Figure 5:
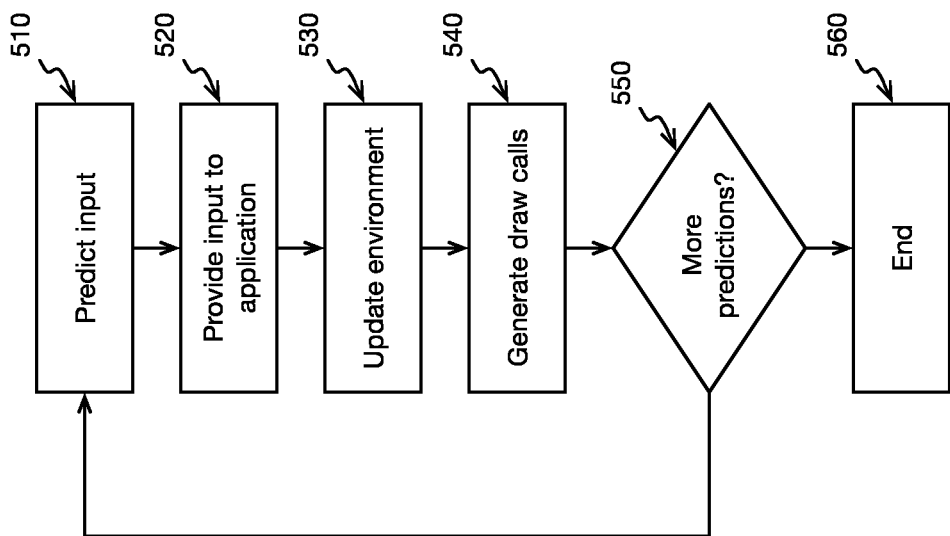
FIG. 5 is a schematic diagram illustrating an example process for processing image content based at least in part on predicted user input, in accordance with embodiments.

FIG. 5 is a flow diagram illustrating an embodiment 500 for processing image content based at least in part on predicted user input. In an implementation, operations depicted in example process 500 may be performed, in whole or in part, by a remote computing device, such as remote computing device 130. However, for other implementations, one or more aspects of example process 500 may be performed at a client device, such as client device 110. It should be noted that content acquired or produced, such as, for example, input signals, output signals, operations, results, etc. associated with example process 500 may be represented via one or more digital signals. It should also be appreciated that even though one or more operations are illustrated or described concurrently or with respect to a certain sequence, other sequences or concurrent operations may be employed. In addition, although the description below references particular aspects and/or features, one or more operations may be performed with other aspects and/or features.

As indicated at block 510, one or more user inputs related to interactive content (e.g., game application, XR application, etc.) may be predicted, in an implementation. For example, a user may interact with a game application, such as application 412, via a user interface of client device 110 (e.g., touchscreen, push buttons, voice commands, gestures, eye movement, etc.). At least in part in response to user input, application 412, executed at least in part at remote computing device 130, may adjust one or more aspects of gameplay based on the user input. For example, application 412 may comprise an automobile racing-type game application. A user may indicate a change in direction of a virtual automobile displayed via display device 120, for example, via a user interface of client device 110. At least in part in response to an indication of a change of direction, for example, application 412 may adjust a scene to be displayed to the user.

For example process 500, to reduce an amount of latency perceived by a user, an input to be provided by the user (e.g., indication of change of direction) may be predicted to allow speculative processing of one or more predicted scenarios. For example, remote computing device 130 may predict a particular user input (e.g., change of direction for a racing-type game) based at least in part on one or more characteristics of application 412 (e.g., characteristics of a particular race track for a racing-type game) and/or based at least in part on previous inputs provided by a user (e.g., history of particular inputs provided by the user at a particular point of a particular race track under particular conditions).

As further indicated at block 520, one or more parameters representative of one or more predicted user inputs may be provided to an application, such as application 412, for example. In an implementation, application 412, for example, may update an environment pertaining to application 412 responsive at least in part to predicted user input, as indicated at block 530. In an implementation, updating an environment may comprise adjusting one or more parameters that may specify one or more visual aspects of application 412, for example. Further, an updated environment may comprise specifications for one or more predicted scenarios for application 412 based at least in part on predicted user input.

In an implementation, application 412, for example, may generate one or more draw calls as indicated at block 540 based at least in part on an environment updated at block 530. For example process 500, generated draw calls may instruct driver 414, for example, to generate image content corresponding to one or more predicted scenarios based at least in part on the updated environment from block 530. In an implementation, draw calls may be provided to driver 414 and/or appropriate commands and/or parameters may be provided to GPU 420 to speculatively generate image content corresponding to the one or more predicted scenarios, for example.

Further, in an implementation, block 550 indicates that if additional user input predictions are expected example process may return to block 510. For circumstances in which no further predictions of user input are expected, example process 500 may terminate as indicated at block 560, for example.

Figure 6:
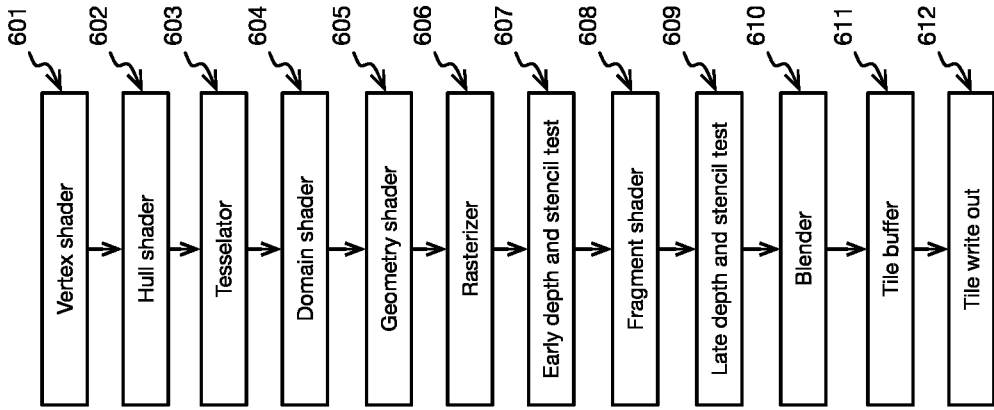
FIG. 6 is a flow diagram depicting an example process for graphical content processing, in accordance with embodiments.

FIG. 6 is a flow diagram depicting an embodiment 600 of an example process for graphical content processing. In an implementation, example process 600 may illustrate aspects of a graphics processing pipeline that may implement one or more aspects of one or more operations described herein, such as in connection with FIGS. 1-5, discussed above, and/or in connection with FIGS. 7-12 discussed below. Further, in implementations, one or more aspects of example graphics pipeline 600 may be utilized to speculatively generate image content corresponding to predicted scenarios based at least in part on predicted user input, as discussed previously. Additionally, for example, one or more aspects of example graphics pipeline 600 may be utilized to render image content, such as frame content, for multiple predicted scenarios. For example, one or more aspects of example graphics pipeline 600 may be performed substantially concurrently for particular regions of image content pertaining to multiple predicted scenarios, as discussed more fully below. In particular implementations, one or more aspects of example graphics pipeline 600 may be performed by a GPU, such as GPU 420. For example, one or more aspects of graphics pipeline 600 may be implemented in hardware circuitry. Further, in implementations, various aspects of example graphics pipeline 600 may be performed at remote computing device 130 and/or client device 110, for example. As mentioned, it may prove advantageous to perform computationally-intensive graphics processing operations, such as one or more operations of example process 600, at a remote computing device, such as remote computing device 130.

It should be noted that content acquired or produced, such as, for example, input signals, output signals, operations, results, etc. associated with example process 600 may be represented via one or more digital signals. It should also be appreciated that even though one or more operations are illustrated or described concurrently or with respect to a certain sequence, other sequences or concurrent operations may be employed. In addition, although the description below references particular aspects and/or features, one or more operations may be performed with other aspects and/or features.

As discussed above, for particular implementations, multiple frames of image content may be generated (e.g. speculatively generated) for multiple predicted scenarios based at least in part on predicted user input. In an implementation, particular tiles and/or other regions of different frames of image content corresponding to respective predicted scenarios may be processed substantially concurrently via one or more aspects of example process 600, as discussed more fully below. As utilized herein, "substantially concurrently" as it relates to processing image content refers to processing particular portions of image content from different predicted scenarios during overlapping periods of time. Various examples of substantially concurrent processing of image content pertaining to predicted scenarios are provided herein.

As depicted in FIG. 6, graphics pipeline 600 may include a number of stages, including, for example, vertex shader circuitry 601, hull shader circuitry 602, tesselator circuitry 603, domain shader circuitry 604, geometry shader circuitry 605, rasterization circuitry 606, early Z (depth) and/or stencil test circuitry 607, fragment shader circuitry 608, late Z (depth) and/or stencil test circuitry 609, blender circuitry 610, tile buffer circuitry 611 and/or down-sampling and/or write-out circuitry 612. In an implementation, vertex shader 601 may generate a set of vertex-shaded output values based at least in part on geometry content such as vertices parameters specified in accordance with an output to be generated (e.g., frame content corresponding to multiple predicted scenarios). Vertex-shaded output values may be utilized by one or more subsequent stages of example graphics pipeline 600, for example. In an implementation, vertex shader 601 may modify input content, such as geometry content, to implement specified lighting effects for an image to be rendered, for example.

In an implementation, hull shader 602 may perform operations on sets of patch control points and/or may generate additional parameters that may be referred to as patch constants. Further, in an implementation, tesselator 603 may subdivide geometry content to generate higher-order representations of hull shader output content. Also, for example, domain shader 604 may perform operations on vertices that may be generated by tesselator 603 (e.g., similar in some respects to a vertex shader) and/or geometry shader 605 may process primitives (e.g., triangles, points, lines, etc.) Vertex shader 601, hull shader 602, tesselator 603, domain shader 604 and/or geometry shader 605 may comprise circuitry to perform specified fragment frontend operations, including, for example, transformation and/or lighting operations and/or operations to setup primitives to be rendered at least in part in response to commands and/or geometry content provided to the graphics pipeline 600.

In an implementation, rasterizer 606 may operate to generate graphics fragments based at least in part on provided primitives. For example, rasterizer 606 may receive graphics primitives for rendering, may rasterize primitives to sampling points and/or may generate graphics fragments having appropriate positions (e.g., representing appropriate sampling positions). Fragments generated by rasterizer may be provided to additional aspects of graphics pipeline 600 for further processing, discussed below.

For example, early depth and/or stencil test circuitry 607 may performs a Z (depth) test on fragments received from rasterizer 606 to determine whether any fragments may be discarded (culled) at this stage. In an implementation, depth values for individual fragments obtained from rasterizer 606 may be tested against depth values for fragments to have been previously rendered to determine whether any of the more recent fragments may be occluded by previously rendered fragments. Additionally, an early stencil test may be performed, for example. In an implementation, depth values may be stored in a depth (Z) buffer that may comprise a portion of tile buffer 611.

Fragments that pass early Z and/or stencil test performed by early depth and/or stencil test circuitry 607 may be provided to fragment shader 608, for example. In an implementation, fragment shader 608 may perform appropriate fragment processing operations for fragments to have passed the early Z and/or stencil tests and/or may generate appropriate rendered fragment content. Implementations may incorporate include any suitable fragment shading processes, including, for example, executing fragment shader programs on fragments, applying textures to fragments, applying fogging and/or other operations to fragments, etc. In an implementation, fragment shader 608 may comprise programmable shader pipeline circuitry. As discussed more fully below, a GPU may include multiple shader pipelines and/or shader cores that may be utilized, at least in part, to substantially concurrently process particular regions (e.g., tiles) of image content pertaining to multiple respective predicted scenarios.

In an implementation, late depth and/or stencil test circuitry 609 may perform, for example, an end-of-pipeline depth test on shaded fragments to determine whether rendered fragments will actually be seen in a displayed image. In an implementation, a depth test may utilize a Z-buffer value for a particular fragment's position stored in a Z-buffer in tile buffer 611 to determine whether newer fragment content should replace previously-rendered fragment content. Further, in an implementation, late depth and/or stencil test circuitry 609 may perform any specified alpha and/or stencil tests on fragments at this particular stage of example pipeline 600. Fragments that pass late fragment testing at stencil test circuitry 609 may undergo blending operations with fragments previously stored in tile buffer 611 via blender circuitry 610. Other remaining operations such as dithering, for example, may also be performed on fragments at this stage of example graphics pipeline 600.

Additionally, in an implementation, blended fragment content may be written to tile buffer 611 for eventual output to a frame buffer for display. Further, for example, depth values for output fragments may be written to a Z-buffer within tile buffer 611. In an implementation, tile buffer 611 may store color and/or depth values for individual sampling points for processed tiles. Such buffers may store an array of fragment content that may represent portions (e.g., a tile) of an overall render output (e.g. image to be displayed), with respective sets of sample values in the buffers corresponding to respective pixels of an overall render output. For situations in which multiple frames of image content are speculatively generated based in predicted scenarios (e.g., based on predicted user input), multiple respective buffers may be implemented.

In an implementation, tile buffer 611 may comprise a portion of a memory located on and/or local to a GPU integrated circuit chip. Content from tile buffer 611 may be provided to down-sampling (e.g., multi-sample resolve) write-out circuitry 612 and/or to an external memory output buffer, such as a frame buffer for delivery to a display device, such as display device 120. In an implementation, down-sampling write-out circuitry 612 may down-sample fragment content stored in tile buffer 611 to a resolution that may be appropriate for a particular display device. Down-sampling write-out circuitry 612 may also alter image resolution depending at least in part on communication latencies measured between remote computing device 130 and client device 110, for example.

In an implementation, responsive at least in part to completion of rendering and/or output for a particular tile, a next tile may be processed, and so on, until an entire frame has been processed. As mentioned, multiple tiles corresponding to respective frames of image content pertaining to multiple predicted scenarios may be processed substantially concurrently, as explained more fully in connection with FIGS. 7-10 below.

Figure 7:
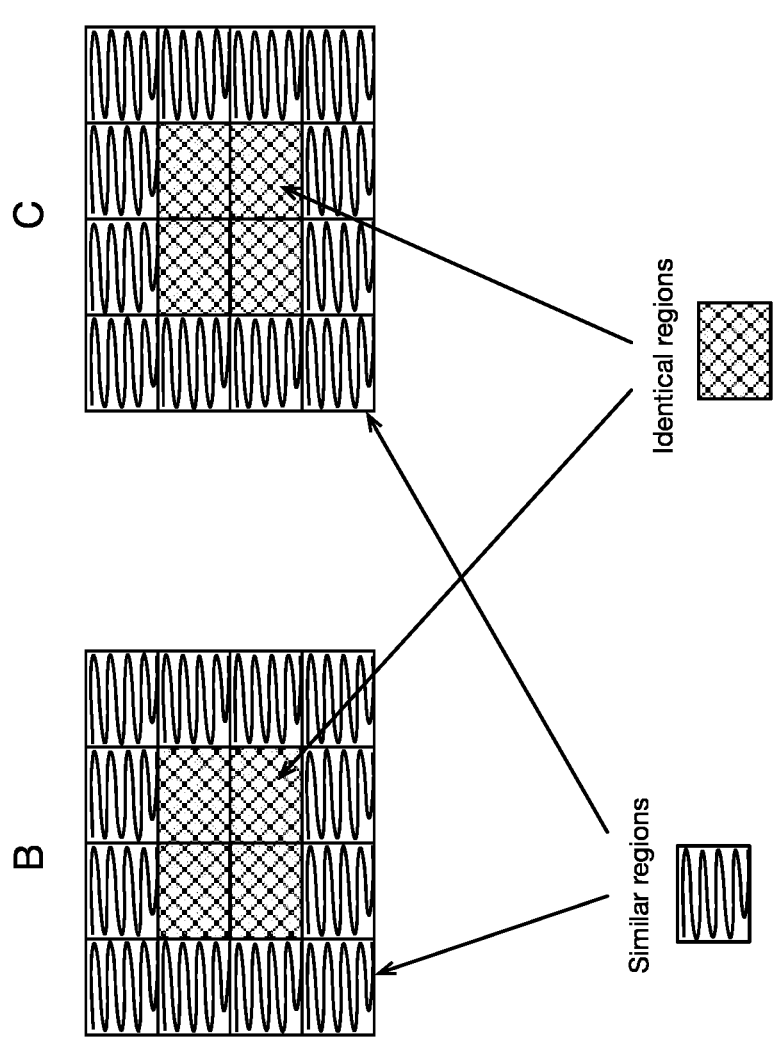
FIG. 7 is an illustration depicting graphical image content for multiple predicted interactive content scenarios, in accordance with embodiments.

FIG. 7 is an illustration depicting graphical image content 700 for multiple predicted scenarios. For example, frames B and C represent image content corresponding to two predicted scenarios, wherein the scenarios are predicted based at least in part on predicted user input. Frames B and C represent different image options that may be selected for display to a user based on subsequent user input. In many circumstances, particular regions (e.g., tiles) of a first frame of image content corresponding to a first predicted scenario may be similar and/or identical to particular regions of a second frame of image content corresponding to a second predicted scenario. For example, a user playing a game may provide inputs from time to time that may result in a change in a displayed scene. However, from frame to frame, changes to a scene may be gradual. For example, significant portions of a next frame may be substantially similar, and perhaps identical, to portions of a current or previous frame. Similarly, differences between frames for predicted scenarios may be minor, with at least some portions of the frames being substantially similar and/or identical in at least some circumstances. For example image content 700, frames B and C (e.g., corresponding to two particular scenarios based on predicted user input) may include some regions that are similar and/or may include some regions that are identical, as indicated.

Figure 8:
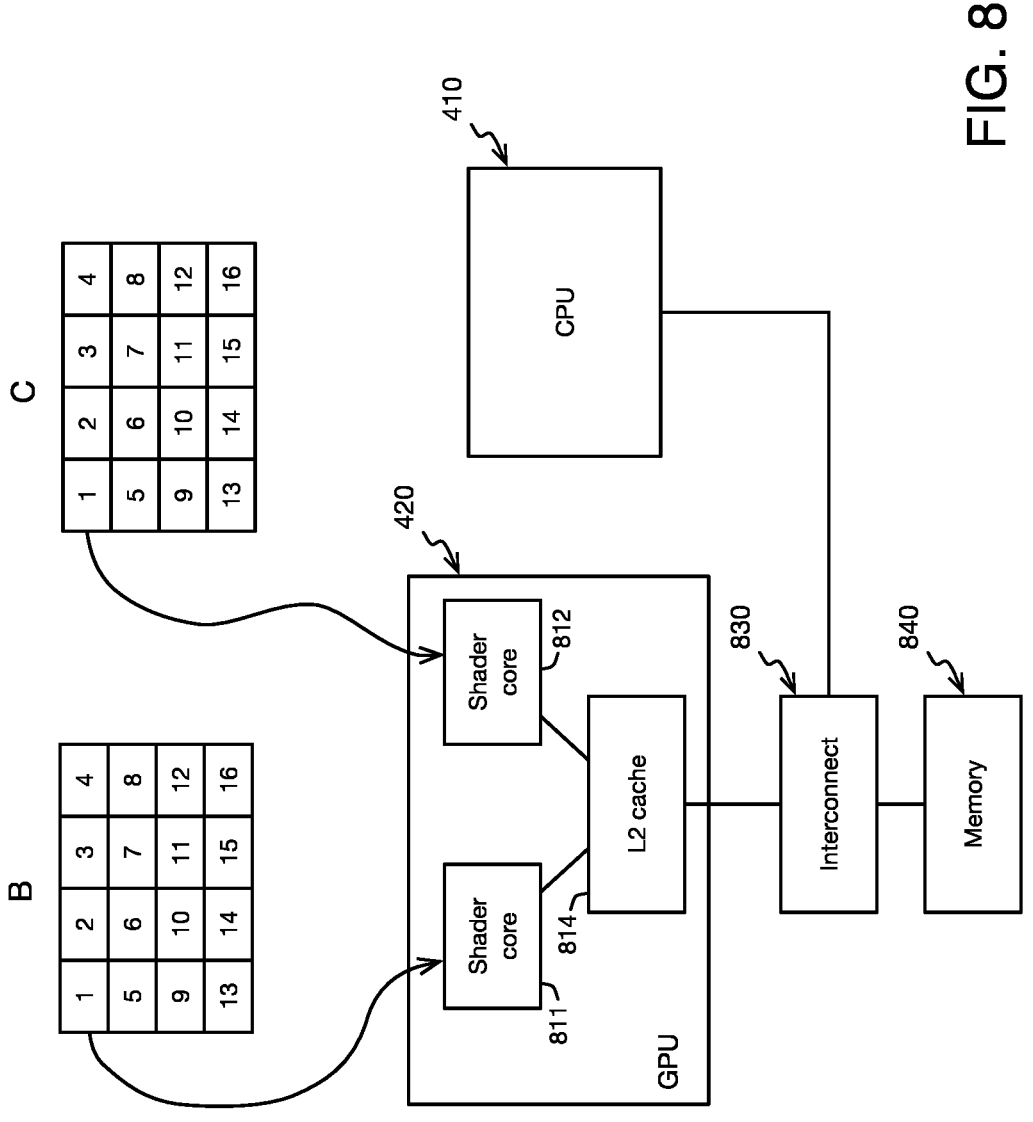
FIG. 8 is a schematic diagram depicting processing of substantially similar and/or substantially identical image content regions for multiple respective predicted interactive content scenarios, in accordance with embodiments.

FIG. 8 is a schematic diagram depicting example frames B and C corresponding respectively to different particular scenarios based on predicted user input. As mentioned, frames B and C, for this example, may include some regions that are similar and/or may include some regions that are identical, as indicated. Because similar tiles may be processed utilizing identical texture and/or attribute content, such as texture content and/or attribute parameters 365, for example, improvements in efficient utilization of computing resources may be achieved. Also, for example, an amount of time to process particular frames, such as frames B and C, may be reduced.

For example, FIG. 8 depicts GPU 420 and CPU 410 (see FIG. 4 and corresponding discussion above). FIG. 8 also depicts an interconnect 830 to enable communication between GPU 420 and CPU 410 and/or to enable communication with memory 840. In an implementation, GPU 420 may include a number of shader cores, such as shader cores (e.g., shader pipelines) 811 and/or 812 that may perform at least some of the operations of example process 300 and/or at least some of the operations of example graphics pipeline 600. For example, shader cores 811 and/or 812 may perform fragment shader operations similar to operations discussed above in connection with fragment shader 608, although other operations may also be performed.

Further, GPU 420 may include a second-level (L2) cache memory 814, for example. In an implementation, "second-level cache" and/or the like refers to a cache external to a shader core. In an implementation, texture content and/or attribute parameters 365, for example, may be stored in L2 cache 814, thereby making texture content and/or attribute parameters 365 available to both shader cores 811 and/or 812. A concept of "memory locality" may indicate that content for processing a particular tile region may be stored in memory near content for processing similar tile regions. Thus, for the current example, because tile regions "1" of frames B and C are similar, it may be likely that texture content and/or attribute parameters 365 for tile regions 1 of frames B and C are stored in close proximity to each other and/or may be requested and/or required by both shader cores 811 and/or 812. Thus, for example, texture content and/or attribute parameters 365 fetched from memory and stored in L2 cache 814 to process tile region 1 of frame B may result texture content and/or attribute parameters 365 to process tile region 1 of frame C also being stored in L2 cache 814.

In an implementation, to take advantage of memory locality, for example, tile regions 1 of frames B and C may be processed by shader cores 811 and 812 substantially concurrently. Because tile regions 1 of frames B and C are similar for this example and/or because tile regions 1 of frames B and C may be processed substantially concurrently, shader cores 811 and/or 812 may process tile regions 1 of frames B and C at least in part utilizing the same or similar texture content and/or attribute parameters 365 stored in L2 cache 814. In this circumstance, there may be no need to fetch additional texture content, for example, as would be the case if tile 1 from frame B differed significantly from tile 1 of frame C and/or if tile regions 1 of frames B and C were to be processed at different times. Also, for example, an amount of content to be fetched may be reduced. In other circumstances, such as if frame B were to be processed before processing frame C, for example, potential advantages of memory locality may be lost.

Although FIG. 8 depicts processing of tile regions 1 of frames B and C, implementations may include processing of the remainder of tiles of frames B and C. In an implementation, respective tile regions from frames B and C may be processed substantially concurrently, as described above in connection with tile regions 1, for example. Also, although FIG. 8 depicts two shader cores, other implementations may incorporate any number of shader cores and/or other circuit types that may substantially concurrently process respective tile regions from any number of frames of image content.

Additionally, the example described above for tile regions 1 of frames B and C being processed substantially concurrently. However, frames B and C are depicted in FIG. 8 as including respective identical tile regions. In an implementation, two or more identical tile regions may be processed a single time. That is, for identical tile regions "6" of frames B and C, for example, tile region 6 of frame B may be processed and the results of such processing may be utilized for tile region 6 of frame C, thereby obviating a need to process additional identical tile regions for other frames.

For example implementations discussed herein, it may be assumed that respective regions for different frames will be similar. For example, tile 1 from frame B and tile 1 from frame C are likely to be similar and/or may be processed substantially concurrently, as previously discussed. However, other implementations may include analysis of various image content to determine whether other particular regions of different frames are similar. For example, it may be determined that frame C has moved by a tile to the right. In such a circumstance, tile 2 of frame B may be processed substantially concurrently with tile 1 of frame C. Similar analysis and/or improvements in efficiency may be performed for example implementations discussed in connection with FIG. 8, such as discussed above, and/or in connection with FIG. 9, discussed below, for example.

Figure 9:
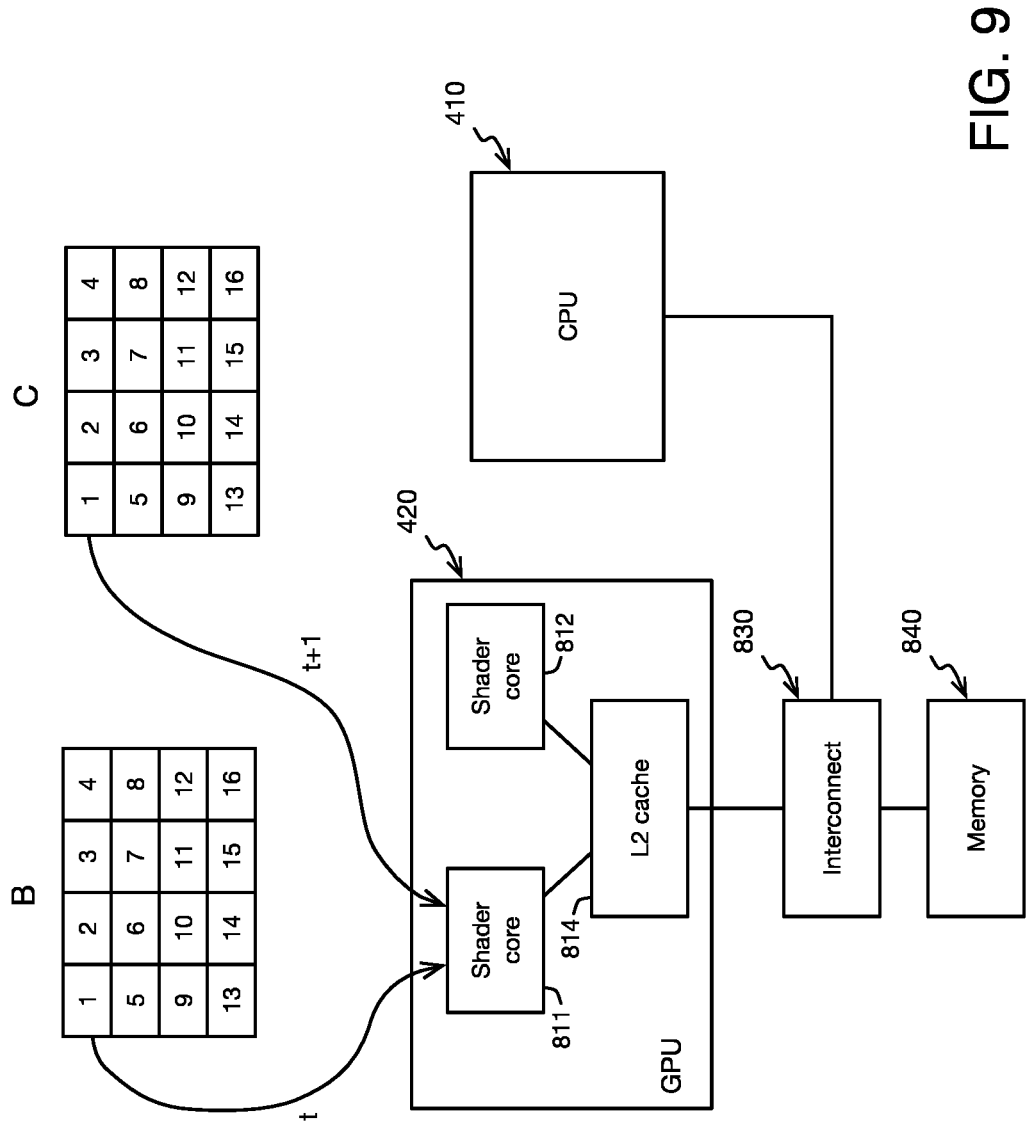
FIG. 9 is a schematic diagram depicting processing of substantially similar and/or substantially identical image content regions for multiple respective predicted interactive content scenarios, in accordance with embodiments.

FIG. 9 is a schematic diagram depicting example frames B and C corresponding respectively to different particular scenarios based on predicted user input. The example of FIG. 9 includes a number of characteristics similar to the example presented above in connection with FIG. 8. However, for the example of FIG. 9, tile regions 1 of frames B and C may be sequentially processed by a single shader core 811, for example. Further, in an implementation, shader cores 811 and/or 812 may include first level cache memories (not shown) that may store texture content and/or attribute parameters 365, for example. "First-level cache" and/or the like refers to a cache integrated into a shader core, in an implementation.

In an implementation, tile region 1 of frame B may be processed at time "t" and tile region 1 of frame C may be processed at time "t+1," for example. It should be noted that although tile shading operations for particular respective regions of different frames may be performed sequentially, the overall processing of the regions of the different frames, such as frames B and C, may be performed substantially concurrently. For example, regions 1 of frames B and C may be processed sequentially, regions 2 of frames B and C may then be processed, followed by regions 3 of frames B and C, and so forth. By processing respective tile regions from the different frames within a relatively short period of time, at least some advantages of memory locality may be achieved, similar in at least some respects to the advantages discussed in connection with the example of FIG. 8. For example, for sequential processing of tile regions 1 of frames B and C, a first-level cache of shader core 811 fetching and/or storing texture content and/or attribute parameters 365 for processing tile region 1 of frame B may also store texture content and/or attribute parameters 365 without a need for an additional access of memory 840 and/or with reduced access to memory 840, for example. Again, substantially concurrent processing of tile regions of different frames corresponding to different predicted scenarios may result in significant improvement in efficient utilization of computing resources due at least in part to memory locality concepts for similar tile regions, for example. Further, a second-level cache, such as L2 cache 814, may likely contain content to be requested and/or required by shaders for frames B and C, for example, again improving locality.

Although example implementations described herein refer to substantially concurrent fragment processing and/or rendering for particular tiles of respective predicted scenarios, other implementations may substantially concurrently perform other types of operations across various image content for respective predicted scenarios. For example, techniques described herein may be expanded to include geometry optimization and/or ray tracing (e.g., hybrid ray tracing), for example.

Additionally, as mentioned, for identical and/or substantially similar regions of different frames corresponding to respective predicted scenarios, a single tile may be processed and the single result utilized for the respective frames. To make a determination that particular regions of different frames are identical and/or substantially similar, an analysis may be performed on input content structures from individual frames for particular tiles, for example. In another implementation, digital signatures, hash values, etc. may be generated for individual tiles of the various frames. In an implementation, signatures, hash values, etc., may be compared to determine whether particular tiles of different frames are identical and/or substantially similar. Additionally, for example, signatures may be generated for a first portion of tile content (e.g., most significant byte of color parameters) and a second signature may be generated for a second portion of tile content. If a first signature of a first tile matches a first signature of a second tile and the second signatures of the two tiles do not match, it may be determined that the two tiles are likely to be similar but not identical.

In another implementation, geometry content and/or tile content may be analyzed to determine whether differences between particular frames are relatively small. If differences are determined to be relatively small, particular tile regions for a first of the respective particular frames may be processed and the results may be utilized for each of the particular frames. In an implementation, results for one frame may be warped in some fashion to generate a second frame, for example.

Further, in an implementation, responsive at least in part to rendering a particular tile region of one or more tile regions of a first frame, a processor, such as GPU 420, for example, may determine whether the particular tile region of the one or more tile regions of the first frame is substantially identical to a previously processed tile region of a previous frame, and may also abstain from writing the particular tile region of the one or more tile regions of the first frame to a buffer at least in part in response to a determination that the particular tile region of the one or more tile regions of the first frame is substantially identical to the previously processed tile region of the previous frame.

Additionally, in an implementation, responsive at least in part to rendering a particular tile region of one or more tile regions of a first frame and further responsive at least in part to rendering a particular tile region of one or more tile regions of a second frame, a processor, such as GPU 420, for example, may determine whether the particular tile region of the one or more tile regions of the first frame is substantially identical to the particular tile region of the one or more tile regions of the second frame. GPU 420, for example, may further, responsive at least in part to a determination that the particular tile region of the one or more tile regions of the first frame is substantially identical to the particular tile region of the one or more tile regions of the second frame, write the particular tile region of the one or more tile regions of the first frame to a buffer and may also abstain from writing the particular tile region of the one or more tile regions of the second frame to the buffer.

Figure 10:
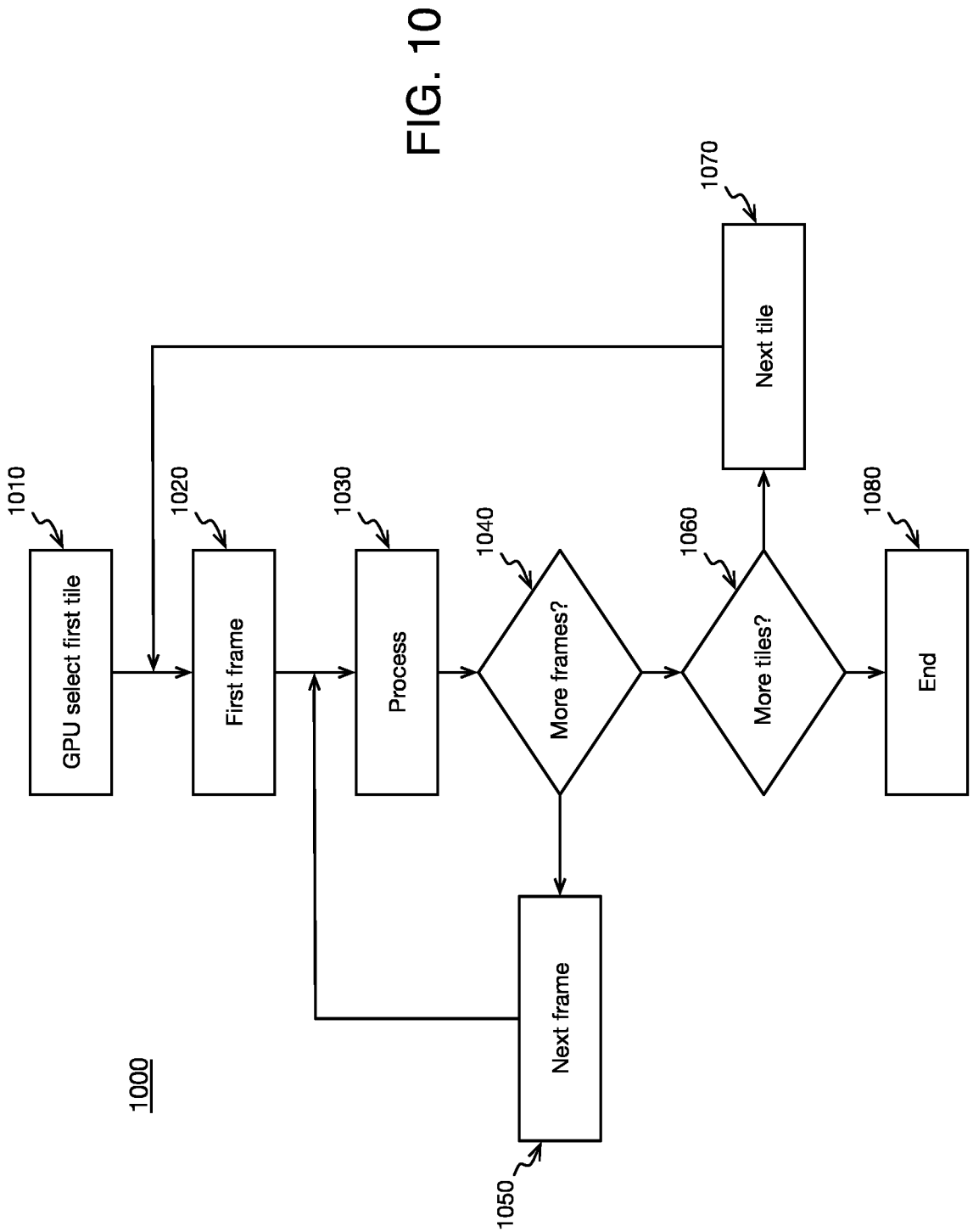
FIG. 10 is a flow diagram depicting an example process for performing graphical operations on image content for predicted interactive content scenarios, in accordance with embodiments.

FIG. 10 is a flow diagram depicting an embodiment 1000 of an example process for performing graphical operations on image content for predicted interactive content scenarios. In an implementation, example process 1000 may be performed at least in part by a GPU, such as GPU 420, of a remote computing device, such as remote computing device 130, for example. It should be noted that content acquired or produced, such as, for example, input signals, output signals, operations, results, etc. associated with example process 1000 may be represented via one or more digital signals. It should also be appreciated that even though one or more operations are illustrated or described concurrently or with respect to a certain sequence, other sequences or concurrent operations may be employed. In addition, although the description below references particular aspects and/or features, one or more operations may be performed with other aspects and/or features.

As depicted at block 1010, a GPU, such as GPU 420, for example, may select a first tile for processing. Block 1020 indicates that a first frame may be selected for processing, in an implementation. Additionally, for example, blocks 1030, 1040 and/or 1050 indicate that first tiles for different frames may be processed until all of the first tiles for the respective frames have been processed. In an implementation, processing of tile regions for the various frames may be performed at least in part by shader cores, such as shader cores 811 and/or 812, of a GPU, such as GPU 420, for example.

As indicated at block 1040, at least in part in response to a determination that first tiles for all of the frames have been processed, a determination may be made at block 1060 to determine whether additional tiles remain to be processed. For the present example, first tiles of the various frames have been processed, but further tiles remain. Therefore, for example, a next tile may be selected as indicated at block 1070 and processing may return to block 1020 where the next tile for the first frame may be processed, followed by processing of next tiles for other frames. Again, it should also be noted that overall processing of the various tile regions of the different frames are processed substantially concurrently due to the processing of particular tiles of the various frames before moving on to process further tiles of the various frames, similar to the example described above in connection with FIG. 9. For example, first tiles for the various frames may be processed, then second tiles for the various frames, then third tiles, fourth tiles, etc. Of course, in some implementations, processing of particular tiles for respective frames may be performed substantially concurrently. For example, in an implementation, operations depicted at blocks 1020, 1030, 1040 and/or 1050 may be performed substantially concurrently. As indicated at block 1080, once all tiles for all frames have been processed, example process 1000 may terminate.

FIG. 11 is a flow diagram depicting an embodiment 1100 of an example process for substantially concurrent processing of image content for multiple respective predicted scenarios. It should be noted that content acquired or produced, such as, for example, input signals, output signals, operations, results, etc. associated with example process 1100 may be represented via one or more digital signals. It should also be appreciated that even though one or more operations are illustrated or described concurrently or with respect to a certain sequence, other sequences or concurrent operations may be employed. In addition, although the description below references particular aspects and/or features, one or more operations may be performed with other aspects and/or features.

In an implementation, example process 1100 may include obtaining at a remote computing device, such as remote computing device 130, signals and/or signal packets representative of one or more user inputs responsive at least in part to user interaction with particular interactive content at a client device, such as client device 110, for example, as indicated at block 1110. Further, in an implementation, example process 1100 may include, at remote computing device 130, predicting at least two scenarios for the particular interactive content based at least in part on the one or more user inputs as indicated at block 1120. Additionally, as indicated at block 1130, example process 1100 may include, at remote computing device 130, processing substantially concurrently at least two images representative at least in part of the at least two respective predicted scenarios for the particular interactive content. Further, in an implementation, the at least two processed images may be provided from remote computing device 130 to client computing device 110, as indicated at block 1140.

In an implementation, the at least two images representative at least in part of the at least two respective predicted scenarios for the particular interactive content may comprise one or more portions of a first frame of image content and one or more portions of a second frame of image content. Further, for example, the one or more portions of the first frame of image content may comprise one or more tile regions of the first frame and the one or more portions of the second frame of image content may comprise one or more tile regions of the second frame.

Additionally, in an implementation, processing substantially concurrently the at least two images representative at least in part of the at least two respective speculative scenarios for the particular interactive content may comprise rendering substantially concurrently the one or more tile regions of the first frame and the one or more tile regions of the second frame. In an implementation, rendering substantially concurrently the one or more tile regions of the first frame and the one or more tile regions of the second frame may comprise processing the one or more tile regions of the first frame and the one or more tile regions of the second frame at one or more shader cores of at least one processor of the remote computing device.

Also, in an implementation, processing the one or more tile regions of the first frame and the one or more tile regions of the second frame at the one or more shader cores of the at least one processor may comprise substantially concurrently processing the one or more tile regions of the first frame in a first shader core of the at least one processor and the one or more tile regions of the second frame in a second shader core of the at least one processor. Further, in an implementation, substantially concurrently processing the one or more tile regions of the first frame in the first shader core of the at least one processor and the one or more tile regions of the second frame in the second shader core of the at least one processor may comprise the first and second shader cores fetching particular content pertaining to the one or more tile regions of the first frame and the one or more tile regions of the second frame from a particular second-level cache of the at least one processor of the remote computing device.

In an implementation, processing the one or more tile regions of the first frame and the one or more tile regions of the second frame at the one or more shader cores of the at least one processor may comprise processing the one or more tile regions of the first frame in a first shader core of the at least one processor and further may comprise subsequently processing the one or more tile regions of the second frame in the first shader core. Additionally, in an implementation, processing the one or more tile regions of the first frame in the first shader core and subsequently processing the one or more tile regions of the second frame in the first shader core may comprise fetching particular content pertaining to the one or more tile regions of the first frame and the one or more tile regions of the second frame from a particular first-level cache of the first shader core.

Further, in an implementation, rendering substantially concurrently the one or more tile regions of the first frame and the one or more tile regions of the second frame may comprise determining whether a particular tile region of the first frame is substantially identical to a corresponding particular tile region of the second frame and may further comprise, responsive at least in part to a determination that the particular tile region of the first frame is substantially identical to the corresponding particular tile region of the second frame, processing the particular tile region of the first frame and utilizing the processing results for both the first frame and the second frame without processing the particular tile region of the second frame.

In an implementation, an example process, such as process 1100, for example, may further comprise, responsive at least in part to rendering a particular tile region of one or more tile regions of a first frame, determining whether the particular tile region of the one or more tile regions of the first frame is substantially identical to a previously processed tile region of a previous frame, and may also comprise, responsive at least in part to a determination that the particular tile region of the one or more tile regions of the first frame is substantially identical to the previously processed tile region of the previous frame, abstaining from writing the particular tile region of the one or more tile regions of the first frame to a buffer.

Additionally, in an implementation, an example process, such as process 1100, for example, may also include, responsive at least in part to rendering a particular tile region of one or more tile regions of a first frame and further responsive at least in part to rendering a particular tile region of one or more tile regions of a second frame, determining whether the particular tile region of the one or more tile regions of the first frame is substantially identical to the particular tile region of the one or more tile regions of the second frame, and may further include, responsive at least in part to a determination that the particular tile region of the one or more tile regions of the first frame is substantially identical to the particular tile region of the one or more tile regions of the second frame, writing the particular tile region of the one or more tile regions of the first frame to a buffer and abstaining from writing the particular tile region of the one or more tile regions of the second frame to the buffer.

In an implementation, providing to the client device from the remote computing device at least a subset of the at least two processed images may comprise, depending at least in part on a communication and/or processing latency parameter, initiating transmission of a subset of the at least two processed images to the client device, initiating transmission of the at least two processed images to the client device wherein the client device to select a subject of the at least two processed images for display, or selecting one of the at least two predicted scenarios and initiating transmission of at least one image representative at least in part of the selected predicted scenario to the client device, or a combination thereof.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall within the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

A "signal measurement" and/or a "signal measurement vector" may be referred to respectively as a "random measurement" and/or a "random vector," such that the term "random" may be understood in context with respect to the fields of probability, random variables and/or stochastic processes. A random vector may be generated by having measurement signal components comprising one or more random variables. Random variables may comprise signal value measurements, which may, for example, be specified in a space of outcomes. Thus, in some contexts, a probability (e.g., likelihood) may be assigned to outcomes, as often may be used in connection with approaches employing probability and/or statistics. In other contexts, a random variable may be substantially in accordance with a measurement comprising a deterministic measurement value or, perhaps, an average measurement component plus random variation about a measurement average. The terms "measurement vector," "random vector," and/or "vector" are used throughout this document interchangeably. In an embodiment, a random vector, or portion thereof, comprising one or more measurement vectors may uniquely be associated with a distribution of scalar numerical values, such as random scalar numerical values (e.g., signal values and/or signal sample values), for example. Thus, it is understood, of course, that a distribution of scalar numerical values, for example, without loss of generality, substantially in accordance with the foregoing description and/or later description, is related to physical measurements, and is likewise understood to exist as physical signals and/or physical signal samples.

The terms "correspond", "reference", "associate", and/or similar terms relate to signals, signal samples and/or states, e.g., components of a signal measurement vector, which may be stored in memory and/or employed with operations to generate results, depending, at least in part, on the above-mentioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or more another memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may, for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, MD, 21050-2747), but may include other aspects, such as the Hadoop distributed file system (HDFS) (available from the Apache Software Foundation, 1901 Munsey Drive, Forrest Hill, MD, 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such as via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

In one example embodiment, as shown in FIG. 12, a system embodiment may comprise a local network (e.g., device 1204 and medium 1240) and/or another type of network, such as a computing and/or communications network. For purposes of illustration, therefore, FIG. 12 shows an embodiment 1200 of a system that may be employed to implement either type or both types of networks. Network 1208 may comprise one or more network connections, links, processes, services, applications, and/or resources to facilitate and/or support communications, such as an exchange of communication signals, for example, between a computing device, such as 1202, and another computing device, such as 1206, which may, for example, comprise one or more client computing devices and/or one or more server computing device. By way of example, but not limitation, network 1208 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 12 may comprise features, for example, of a client computing device and/or a remote/server computing device, in an embodiment. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or similar terms, then, it is intended, pursuant to that statutory section, that corresponding structure, material and/or acts for performing one or more functions be understood and be interpreted to be described at least in FIGS. 1-11 and in the text associated with the foregoing figure(s) of the present patent application.

Referring now to FIG. 12, in an embodiment, first and third devices 1202 and 1206 may be capable of rendering a graphical user interface (GUI) for a network device and/or a computing device, for example, so that a user-operator may engage in system use. Device 1204 may potentially serve a similar function in this illustration. Likewise, in FIG. 12, computing device 1202 ('first device' in figure) may interface with computing device 1204 ('second device' in figure), which may, for example, also comprise features of a client computing device and/or a remote and/or server computing device, in an embodiment. Processor (e.g., processing device) 1220 and memory 1222, which may comprise primary memory 1224 and secondary memory 1226, may communicate by way of a communication bus 1215, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1204, as depicted in FIG. 12, is merely one example, and claimed subject matter is not limited in scope to this particular example.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (VVi-MAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, and/or Flickr, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 12, computing device 1202 may provide one or more sources of executable computer instructions in the form physical states and/or signals (e.g., stored in memory states), for example. Computing device 1202 may communicate with computing device 1204 by way of a network connection, such as via network 1208, for example. As previously mentioned, a connection, while physical, may not necessarily be tangible. Although computing device 1204 of FIG. 12 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1222 may comprise any non-transitory storage mechanism. Memory 1222 may comprise, for example, primary memory 1224 and secondary memory 1226, additional memory circuits, mechanisms, or combinations thereof may be used. Memory 1222 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1222 may be utilized to store a program of executable computer instructions. For example, processor 1220 may fetch executable instructions from memory and proceed to execute the fetched instructions. Memory 1222 may also comprise a memory controller for accessing device readable-medium 1240 that may carry and/or make accessible digital content, which may include code, and/or instructions, for example, executable by processor 1220 and/or some other device, such as a controller, as one example, capable of executing computer instructions, for example. Under direction of processor 1220, a non-transitory memory, such as memory cells storing physical states (e.g., memory states), comprising, for example, a program of executable computer instructions, may be executed by processor 1220 and able to generate signals to be communicated via a network, for example, as previously described. Generated signals may also be stored in memory, also previously suggested.

Memory 1222 may store electronic files and/or electronic documents, such as relating to one or more users, and may also comprise a computer-readable medium that may carry and/or make accessible content, including code and/or instructions, for example, executable by processor 1220 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 12, processor 1220 may comprise one or more circuits, such as digital circuits, to perform at least a portion of a computing procedure and/or process. By way of example, but not limitation, processor 1220 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1220 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 12 also illustrates device 1204 as including a component 1232 operable with input/output devices, for example, so that signals and/or states may be appropriately communicated between devices, such as device 1204 and an input device and/or device 1204 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising: at a remote computing device:
   obtaining signals and/or signal packets representative of one or more user inputs responsive to user interaction with particular interactive content at a client device;
   predicting at least two scenarios for the particular interactive content based at least in part on the one or more user inputs, wherein first and second frames of image content are representative at least in part of respective ones of the predicted at least two scenarios for the particular interactive content;
   responsive at least in part to the remote computing device identifying a second tile of the second frame similar in at least some aspects to, but not identical to, a first tile of the first frame, sequentially processing the first tile of the first frame and the second tile of the second frame at a first shader core of a first processor of the remote computing device, wherein the sequentially processing the first tile of the first frame and the second tile of the second frame includes the first shader core utilizing particular texture content and/or attribute parameters obtained from a cache memory local to the first shader core to process both the first tile and the second tile; and providing to the client device from the remote computing device at least a subset of the sequentially processed the at least the first tile of the first frame and the second tile of the second frame.

2. The method of claim 1, further comprising sequentially processing, at the first shader core, a plurality of corresponding tiles of a plurality of frames of image content representative at least in part of respective ones of the predicted at least two scenarios for the particular interactive content.

3. The method of claim 1, wherein the sequentially processing the first tile of the first frame and the second tile of the second frame comprises sequentially rendering the first tile of the first frame and the second tile of the second frame.

4. The method of claim 3, further comprising substantially concurrently rendering a third tile of the first frame and a fourth tile of the second frame at the first shader core and at a second shader core, respectively.

5. The method of claim 3, further comprising:

responsive at least in part to rendering the first tile of the first frame, determining whether the rendered first tile of the first frame is identical to or substantially similar to a previously rendered tile of a previous frame; and responsive at least in part to a determination that the rendered first tile of the first frame is identical to or substantially similar to the previously rendered tile of the previous frame, abstaining from writing the rendered first tile of the first frame to a buffer.

6. The method of claim 3, further comprising:

responsive at least in part to rendering the first tile of the first frame and further responsive at least in part to rendering the second tile of the second frame, determining whether the rendered first tile of the first frame is identical to or substantially similar to the rendered second tile of the second frame; and responsive at least in part to a determination that the rendered first tile of the first frame is identical to or substantially similar to the rendered second tile of the second frame, writing the rendered first tile of the first frame to a buffer and abstaining from writing the rendered second tile of the second frame to the buffer.

7. The method of claim 1, further comprising substantially concurrently processing a third tile of the first frame in the first shader core and a fourth tile of the second frame in a second shader core of the first processor.

8. The method of claim 7, wherein the substantially concurrently processing the third tile of the first frame in the first shader core and the fourth tile of the second frame in the second shader core of the first processor comprises the first and second shader cores accessing a second cache memory that is external to the first and second shader cores.

9. The method of claim 7, wherein the substantially concurrently processing the third tile of the first frame in the first shader core and the fourth tile of the second frame in the second shader core of the first processor comprises rendering the third tile of the first frame in the first shader core and further comprises rendering the fourth tile in the second shader core.

10. The method of claim 8, wherein the second cache memory of the first processor comprises a second level cache memory integrated into the first processor.

11. The method of claim 1, further comprising:

determining whether a third tile of the first frame is identical to or substantially similar to a fourth tile of the second frame; and responsive at least in part to a determination that the third tile of the first frame is identical to or substantially similar to the fourth tile of the second frame, rendering the third tile of the first frame and utilizing the rendered third tile of the first frame for both the first frame and the second frame without rendering the fourth tile of the second frame.

12. The method of claim 1, wherein the providing to the client device from the remote computing device the at least the subset of the sequentially processed first tile of the first frame and the second tile of the second frame comprises, depending at least in part on a communication and/or processing latency parameter:

initiating transmission of the at least the subset of the sequentially processed the first tile of the first frame and the second tile of the second frame to the client device;

initiating transmission of the at least the subset of the sequentially processed first tile of the first frame and the second tile of the second frame to the client device wherein the client device is to select the at least the subset of the sequentially processed the first tile of the first frame and the second tile of the second frame for display; or selecting one of the predicted at least two scenarios and initiating transmission of at least one image representative at least in part of the at least the subset of the sequentially processed the first tile of the first frame and the second tile of the second frame for display to the client device; or a combination thereof.

13. A remote computing device, comprising:

a communications interface to receive signals and/or signal packets representative of one or more user inputs responsive to user interaction with particular interactive content at a client device;

a first processor to predict at least two scenarios for the particular interactive content based at least in part on the one or more user inputs, wherein first and second frames of image content are representative at least in part of respective ones of the predicted at least two scenarios for the particular interactive content;

wherein, responsive at least in part to an identification of a second tile of the second frame similar in at least some aspects to, but not identical to, a first tile of the first frame, a first shader core of the first processor to process sequentially the first tile of the first frame and the second tile of the second frame, wherein, to process sequentially the first tile of the first frame and the second tile of the second frame, the first shader core to utilize particular texture content and/or attribute parameters obtained from a cache memory local to the first shader core to process both the first tile of the first frame and the second tile of the second frame; and wherein the first processor to initiate transmission of at least a subset of the sequentially processed the at least the first tile of the first frame and the second tile of the second frame to the client device.

14. The remote computing device of claim 13, wherein, to sequentially process the first tile of the first frame and the second tile of the second frame, the first shader core to sequentially render the first tile of the first frame and the second tile of the second frame.

15. The remote computing device of claim 14, wherein the first processor to substantially concurrently process a third tile of the first frame and a fourth tile of the second frame at the first shader core and at a second core of the first processor.

16. The remote computing device of claim 14, wherein the first processor further to:

responsive at least in part to the render of the first tile of the first frame, determine whether the rendered first tile of the first frame is identical to or substantially similar to a previously rendered tile of a previous frame; and responsive at least in part to a determination that the first tile of the first frame is identical to or substantially similar to the previously rendered tile of the previous frame, abstain from storing the rendered first tile of the first frame to a buffer.

17. The remote computing device of claim 14, wherein the first processor further to:

responsive at least in part to the render of the first tile of the first frame and further responsive at least in part to the render of the second tile of the second frame, determine whether the rendered first tile of the first frame is identical to or substantially similar to the rendered second tile of the second frame; and responsive at least in part to a determination that the rendered first tile of the first frame is identical to or substantially similar to the rendered second tile of the second frame, initiate storage of the rendered first tile of the first frame to a buffer and abstain from writing the rendered second tile of the second frame to the buffer.

18. The remote computing device of claim 13, wherein the first processor to substantially concurrently process a third tile of the first frame in the first shader core and a fourth tile of the second frame in a second shader core.

19. The remote computing device of claim 18, wherein, to substantially concurrently process the third tile of the first frame in the first shader core and the fourth tile of the second frame in the second shader core, the first processor to access a second cache memory that is external to the first and second shader cores.

20. The remote computing device of claim 19, wherein the second cache memory to comprise a second level cache memory integrated into the first processor.

21. The remote computing device of claim 18, wherein, to substantially concurrently process the third tile of the first frame and the fourth tile of the second frame, the first processor to render the third tile of the first frame in the first shader core and further to render the fourth tile of the second frame in the second shader core.

22. The remote computing device of claim 13, wherein the first processor further to:

determine whether a third tile of the first frame is substantially identical to a fourth tile of the second frame; and responsive at least in part to a determination that the third tile of the first frame is identical to or substantially similar to the fourth tile of the second frame, the first processor to render the third tile of the first frame and to utilize the rendered third tile of the first frame for both the first frame and the second frame without rendering the fourth tile of the second frame.

23. The remote computing device of claim 13, wherein, to initiate transmission of the at least the subset of the sequentially processed the at least the first tile of the first frame and the second tile of the second frame to the client device, the first processor to, depending at least in part on a communication and/or processing latency parameter:

initiate transmission of the at least the subset of the sequentially processed the first tile of the first frame and the second tile of the second frame to the client device;

initiate transmission of the at least the subset of the sequentially processed the first tile of the first frame and the second tile from the second frame to the client device wherein the client device is to select the at least the subset of the sequentially processed the at least the first tile of the first frame and the second tile of the second frame for display; or select one of the predicted at least two scenarios and initiating transmission of at least one image representative at least in part of the at least the subset of the sequentially processed the first tile of the first frame and the second tile of the second frame to the client device;

or a combination thereof.

* * * * *